US011560249B2

(12) United States Patent
Schaafsma et al.

(10) Patent No.: US 11,560,249 B2
(45) Date of Patent: Jan. 24, 2023

(54) CASE UNPACKING SYSTEM AND METHOD

(71) Applicant: DLN Integrated Systems, Inc., Byron Center, MI (US)

(72) Inventors: Phillip Schaafsma, Byron Center, MI (US); Robert Clarkson, Byron Center, MI (US); Garrett Smith, Byron Center, MI (US); Travis Kempton, Byron Center, MI (US); Christopher Anten, Byron Center, MI (US); Zachary Nickels, Byron Center, MI (US)

(73) Assignee: DLN Integrated Systems, Inc., Byron Center, MI (US)

( * ) Notice: Subject to any disclaimer, the term of this patent is extended or adjusted under 35 U.S.C. 154(b) by 61 days.

(21) Appl. No.: 17/086,877

(22) Filed: Nov. 2, 2020

(65) Prior Publication Data
US 2021/0130025 A1    May 6, 2021

Related U.S. Application Data

(60) Provisional application No. 62/929,333, filed on Nov. 1, 2019.

(51) Int. Cl.
*B65B 69/00* (2006.01)
*B65G 47/52* (2006.01)
*B65G 47/91* (2006.01)
*B65B 43/52* (2006.01)

(52) U.S. Cl.
CPC .......... *B65B 69/0033* (2013.01); *B65B 43/52* (2013.01); *B65G 47/52* (2013.01); *B65G 47/91* (2013.01)

(58) Field of Classification Search
CPC .................................................. B65B 69/0033
See application file for complete search history.

(56) References Cited

U.S. PATENT DOCUMENTS

| 7,720,567 | B2 * | 5/2010 | Doke ................... | B25J 11/0055 |
| | | | | 700/230 |
| 8,690,011 | B2 * | 4/2014 | Adell .................. | B65B 69/0033 |
| | | | | 414/412 |
| 10,329,042 | B2 | 6/2019 | Nammoto et al. | |
| 11,161,640 | B2 * | 11/2021 | Nishigaito .......... | B65B 69/0033 |
| 11,325,736 | B2 * | 5/2022 | Gabusi ............... | B65B 69/0008 |
| 2013/0125517 | A1 | 5/2013 | Gomi | |
| 2014/0190130 | A1 | 7/2014 | Cramer | |
| 2019/0071267 | A1 | 3/2019 | Otsuru | |
| 2020/0122870 | A1 * | 4/2020 | Wapinsky ............... | B65B 43/52 |

* cited by examiner

*Primary Examiner* — Mark C Hageman
(74) *Attorney, Agent, or Firm* — Varnum LLP

(57) ABSTRACT

A product unpacking system includes a work surface at a first height and a product unloading position at a second height. An adjustable cutter is positioned adjacent to the work surface and configured to cut a plurality of sides of each case. A case movement device, such as a robot or manual mover, is configured to retrieve a case from a group of cases and move the case to the cutter to cut a plurality of sides of the case. The case movement device may then move the cut case to an unload position over a product container to allow products within the case to drop into the product container. A system of conveyors may be used to convey empty product containers toward the work surface and to convey filled product containers away from the work surface. The system may be automated to receive recipe information for each case to be unloaded and modify parameters of the system based on the case.

20 Claims, 12 Drawing Sheets

CASE UNPACKING SYSTEM AND METHOD

CROSS-REFERENCE TO RELATED APPLICATIONS

This application claims priority to U.S. Provisional Patent Application No. 62/929,333 filed on Nov. 1, 2019 and entitled CASE UNPACKING SYSTEM AND METHOD which is hereby incorporated by reference.

FIELD OF INVENTION

The field of invention relates generally to a system for removing products from a packaging case and more specifically to cutting and emptying products from a bottom surface of a product package.

BACKGROUND

Consumer products are often packaged in cases, such as cardboard boxes, for shipping and conveying purposes. Packaging products in portable cases may aid in both shipping and counting the products. Commonly, products are unpackaged and repacked into different containers, such as totes, bins or the like, for purposes improving portability and conveyance. The new containers may hold products in different quantities than the original product cases and may be more conducive for transfer or storage.

The process of unpacking products from a packed case may be difficult and time consuming for several reasons. First, the case or initial product holder must be opened without any harm to the products inside. Second, the products must be removed and separated from the case without any harm to the products, and in some instances removed one by one, which can take additional time.

While some automated processes for unpacking products from a case exist, they suffer from similar drawbacks to the related manual processes and require numerous steps that lead to longer cycle times.

For at least these reasons, an improved product unpacking system and method are needed in the industry.

SUMMARY

A product unpacking system is generally provided. The product unpacking system includes a plurality of cases, each containing one or more products therein. The product unpacking system further includes a work surface at a first height and a product unloading position at a second height. The work surface is configured to receive one or more cases thereon, each having one or more products therein. The system further includes a cutter positioned at or adjacent to the work surface. The cutter is configured to cut a surface of the case when the case is positioned adjacent to or at the cutter. A case movement device is configured to move a case to the cutter to cut a plurality of sides of the case, and to move the cut case to an unload position over a product container at the unload position to allow products within the case to drop into the product container.

In an embodiment, the product unpacking system further includes an empty product container conveyor configured to convey empty product containers toward the work surface. A positioning mechanism may be configured to move an empty product container from the empty product conveyor to the unload position. The system may include one or more product container exit conveyors to move product containers full of products away from the work surface.

In an embodiment, the case movement device may comprise a robot. The robot may include a gripping or suction tool to move the cases. The suction tool may be configured to provide variable location and size of suction based on parameters of a case to be moved. The robot may be configured to remove cases from the plurality of cases and put them onto the work surface.

In an embodiment, the product unpacking system may be configured to provide adjustment of the cutter, such as height and depth adjustments. The adjustments may be made based on known parameters of a case to be cut. The product unpacking system may further include one or more empty case conveyors configured to convey empty cases away from the work surface.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
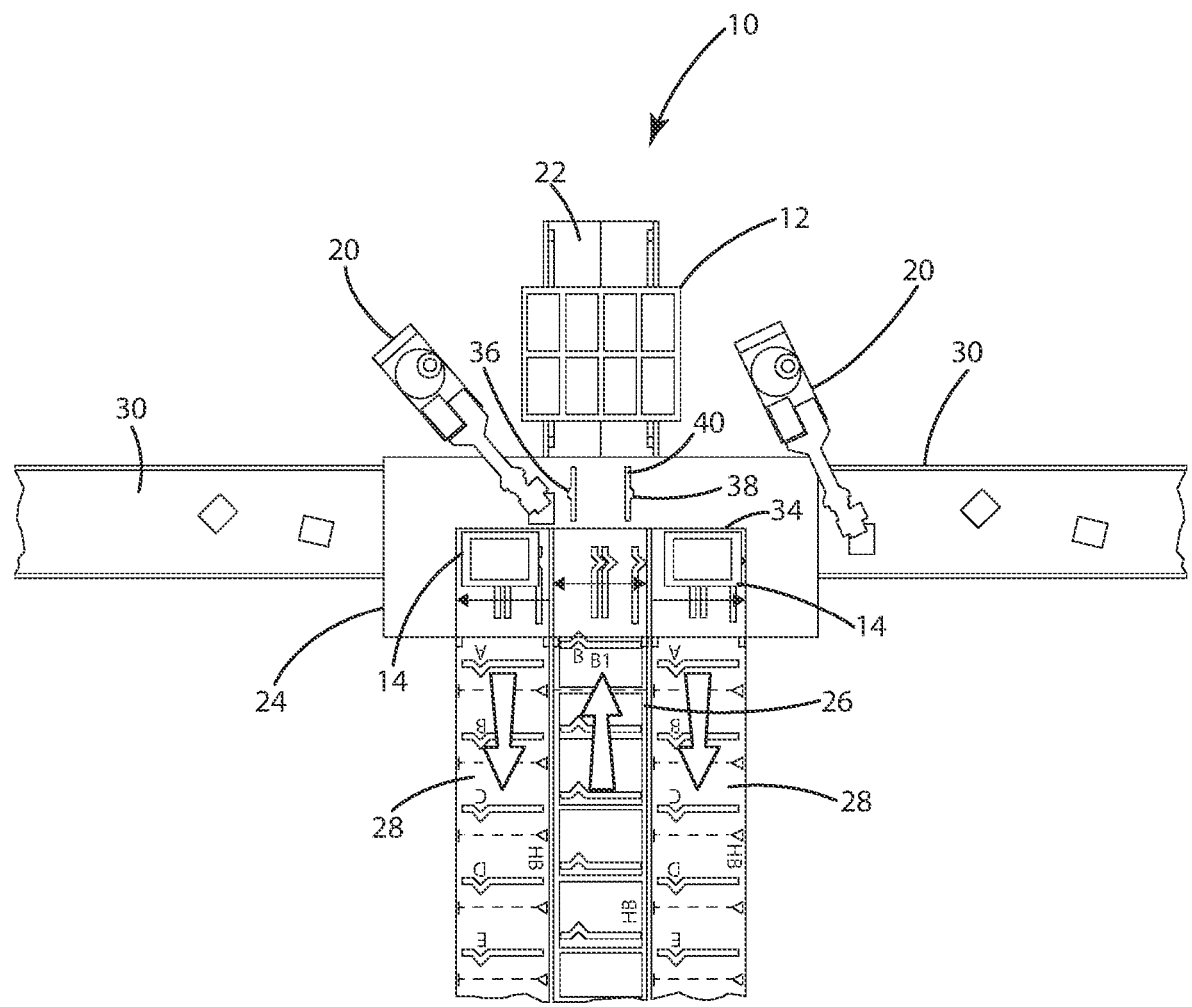
FIG. 1 illustrates a top view of a case unpacking system with an integrated tote conveyer assembly.
Figure 2:
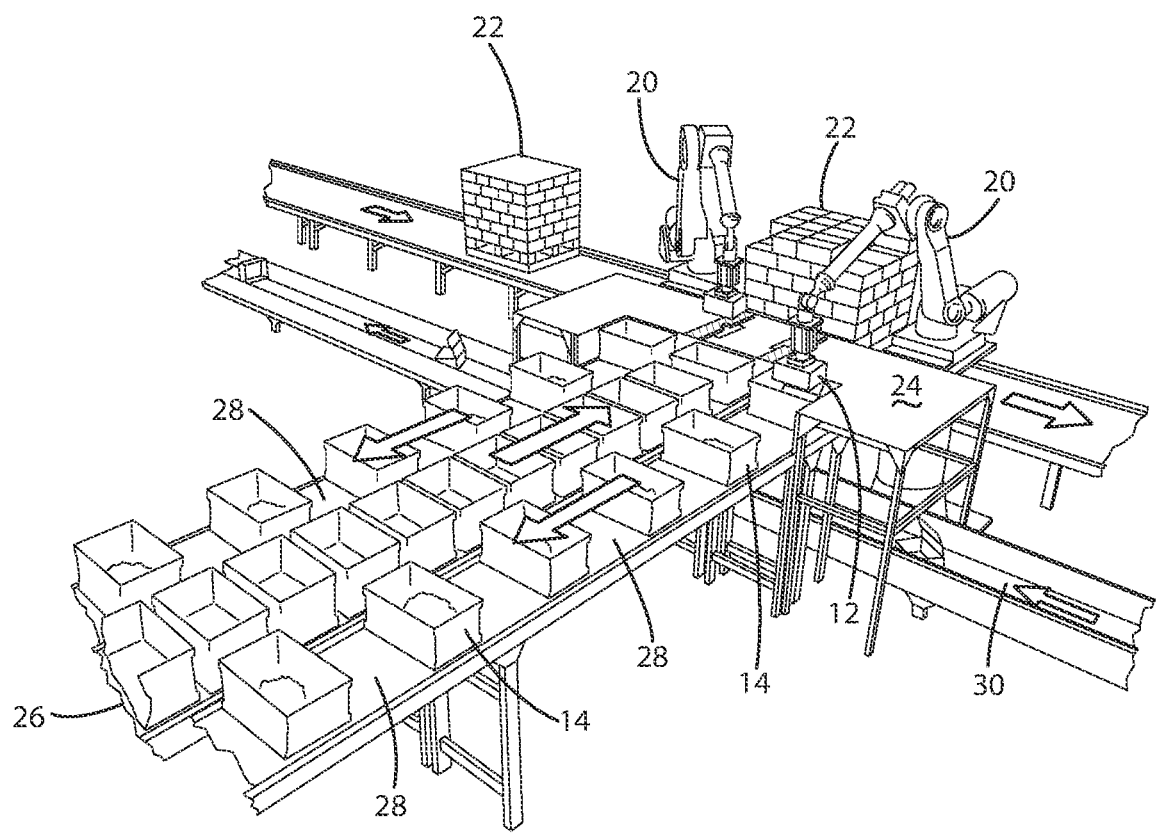
FIG. 2 illustrates a right perspective view of a case unpacking system having two tote exit conveyors and two robots.
Figure 3:
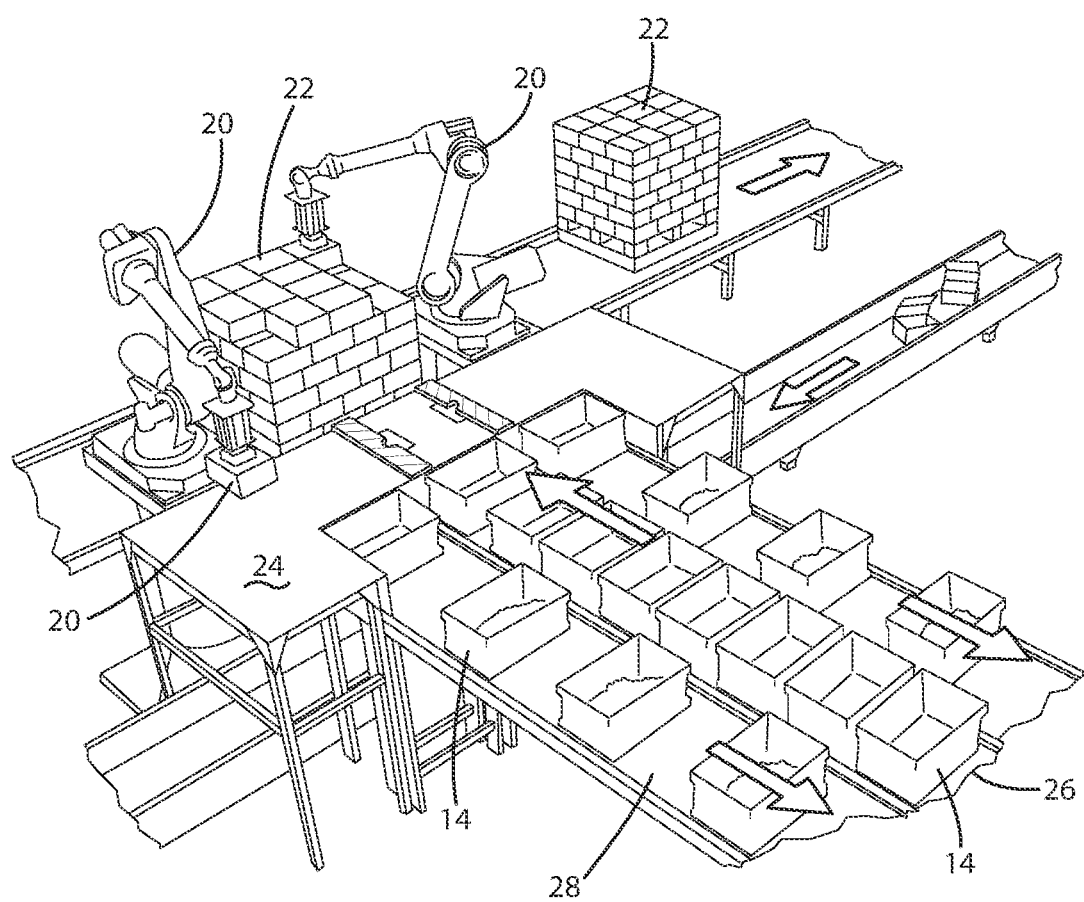
FIG. 3 illustrates a left perspective view of a case unpacking system having two tote exit conveyors and two robots.
Figure 4:
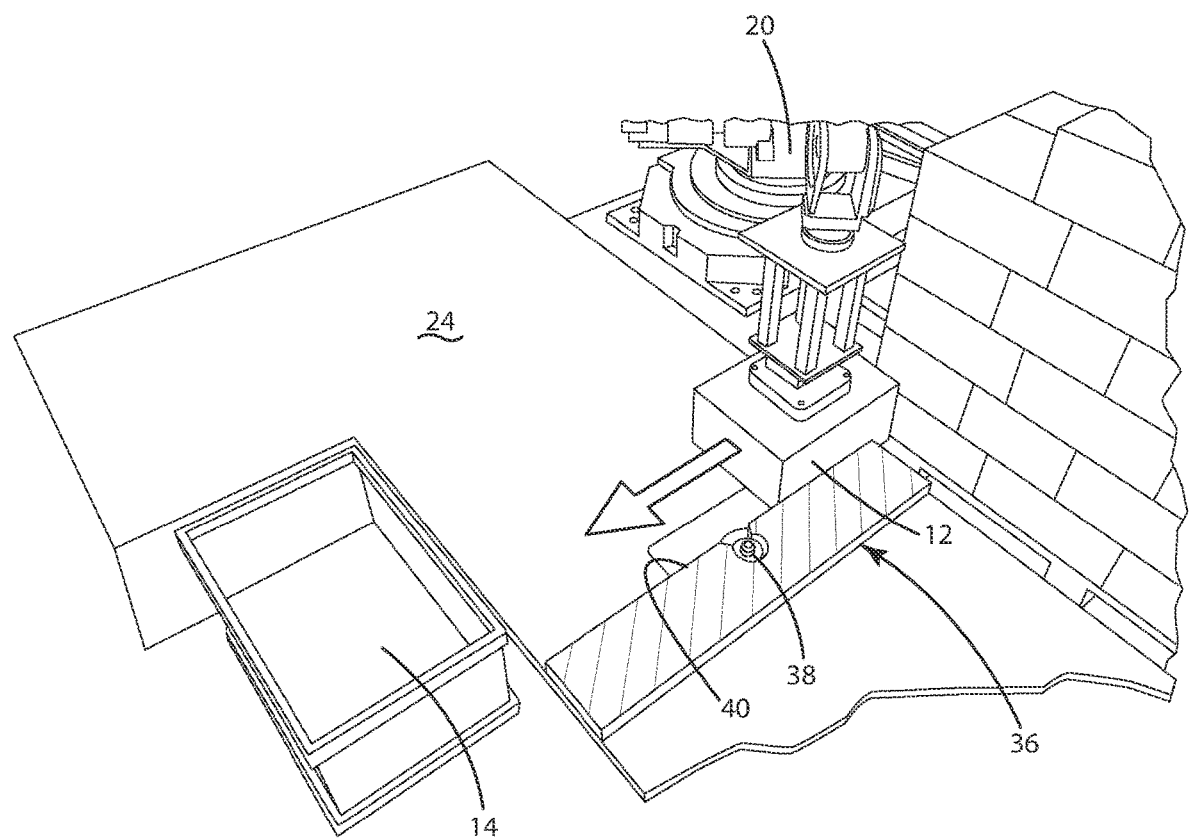
FIG. 4 illustrates a case engaging a case cutter having a fence and cutting blade.
Figure 5:
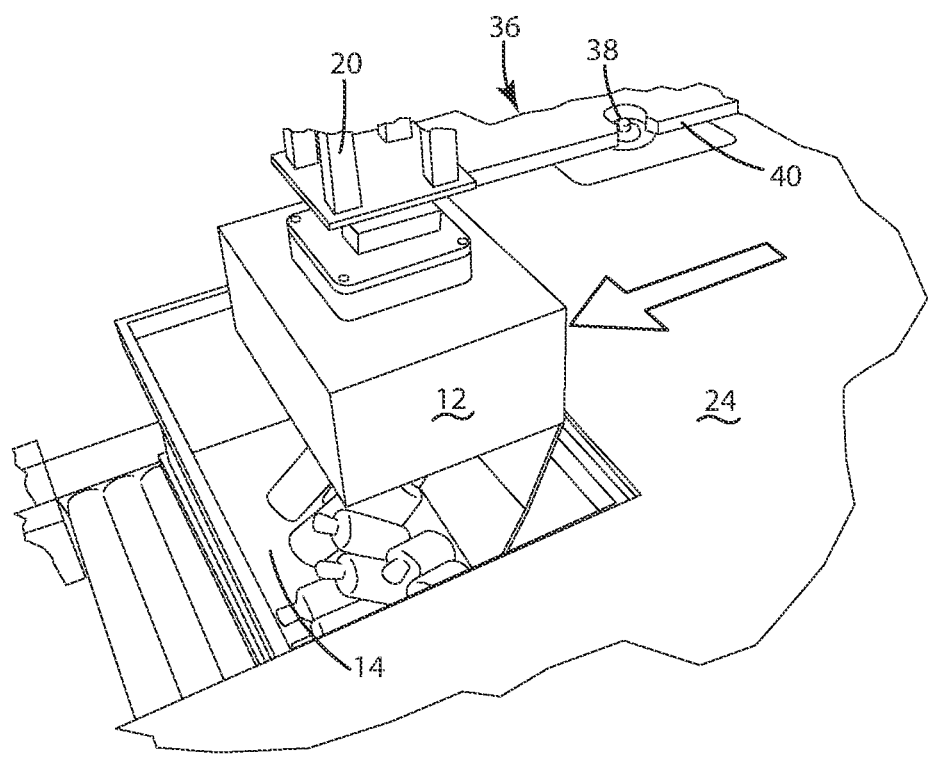
FIG. 5 illustrates a cut case emptying its contents into a tote.
Figure 6:
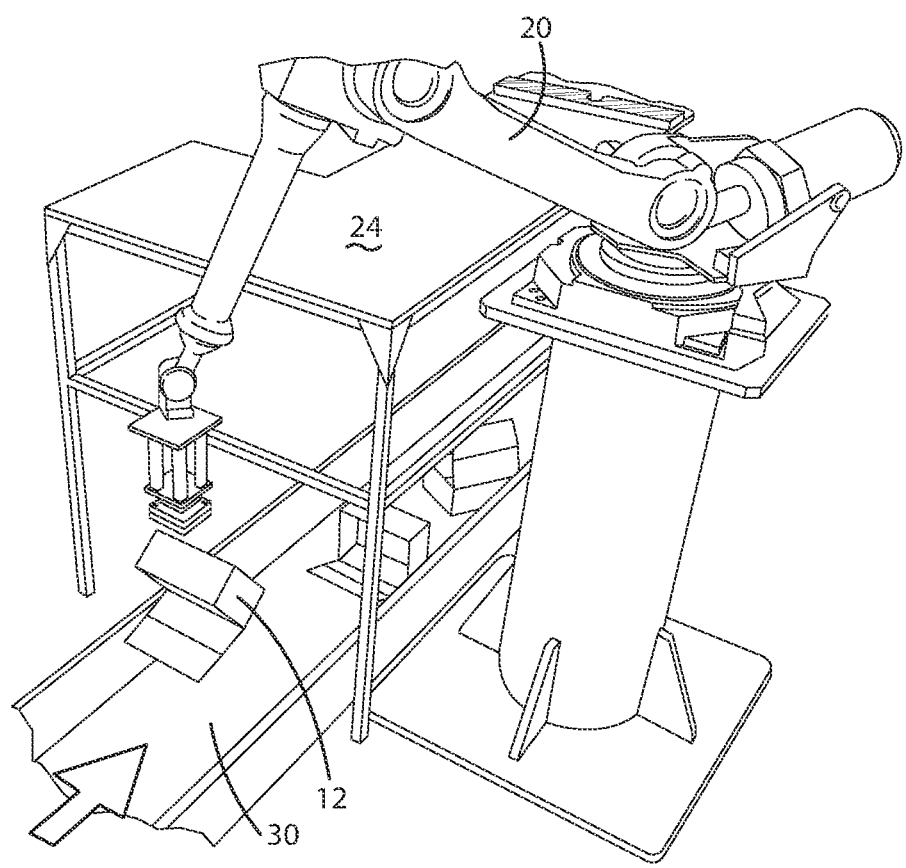
FIG. 6 illustrates an empty case being released onto an empty case refuse conveyor.

With reference to FIG. 1, a product unpacking system, or unpacking system, 10 is generally presented. The unpacking system 10 is shown and described herein as an automated system, however, it will be appreciated that the same steps described in the automated process may be performed manually, as also set forth below.

The unpacking system 10 may be generally configured to perform the steps of: 1) unloading product cases 12 off of a pallet, case stack, or case conveyor and onto a work surface 24; 2) cutting sides of the unloaded case; 3) moving the cut case 12 to an unload position over a secondary container 14; and 4) allowing products to be released and emptied from the case 12 through a bottom surface of the case 12.

As used herein, it will be appreciated that the term product cases 12 may include any box or packaging container, including but not limited to cardboard boxes, that contain individual products. The cases 12 may be cube shaped or may be any other appropriate shape.

The unpacking system 10 may include one or more robots 20 or similar automated machines to perform the unpacking steps described herein. Alternatively, the steps may be performed manually. As shown in FIG. 1, the unpacking system 10 may include two robots 20, positioned on opposite sides of a stack of cases 12. In some embodiments, the unpacking system 10 may further include additional robots 20 or other automated machines to speed up or enhance the unpacking process. The robots 20 may include a mechanism for picking up, moving, lifting, or otherwise transporting product cases 12. For example, the robots 20 may include suction cups, grippers, or the like to grab or latch onto a case 12 and remove it from a stack or pallet 22, slide it along a work surface 24 or move the case 12 to a desired location.

The unpacking system 10 may comprise a workstation that includes a work surface 24, a tote delivery conveyor 26, one or more tote exit conveyors 28, and one or more empty case refuse conveyors 30. As shown in FIG. 1, the work surface 24 may comprise a table or surface positioned adjacent to a pallet 22 of cases 12. The work surface 24 may be positioned directly adjacent to and above the tote delivery and exit conveyors 26, 28. For example, the work surface 24 may include an outer edge 34 that extends above and/or adjacent to a portion of the tote delivery and exit conveyors 26, 28. The empty case refuse conveyors 30 may be positioned on one or more sides of the work surface 24 at a height that is lower than the work surface 24. The tote delivery conveyor 26 may be configured to convey empty totes 14 towards the work surface, as indicated by the arrow on the central conveyor in FIG. 1, while the tote exit conveyors 28 may be configured to convey filled totes 14 away from the work surface 24, as indicated by the arrows on the outside conveyors in FIG. 1. The empty case refuse conveyors 30 may also be configured to convey empty cases 12 away from the work surface 24.

The work surface may include a cutter 36. The cutter 36 may be a router style cutter connected to or embedded into the work surface 24 or may be a linear cutter 36. The cutter may include a blade 38, such as a circular, rotary, linear, or fixed blade, extending from a fence 40. The blade 38 may be arranged generally parallel to the work surface 24, or at any appropriate angle, to allow the cutting surface of the blade 38 to engage a side of a case 12 when the bottom of a case 12 is resting on the work surface 24. The cutter 36 may be adjustable along one or more axes. For example, the cutter blade 38 maybe adjustable to vary the depth of the cut into the case 12 by adjusting the distance that the blade 38 protrudes from the fence 40. The cutter 36 may additionally be vertically adjusted to adjust the height of the cut along the side of the case 12. Adjustments to the cutter 36 settings may be made manually or may be automated. As described in further detail below, the cutter 36 may be set to predetermined positions based on parameters and dimensions of the cases 12 that are being unpacked.

Figure 7:
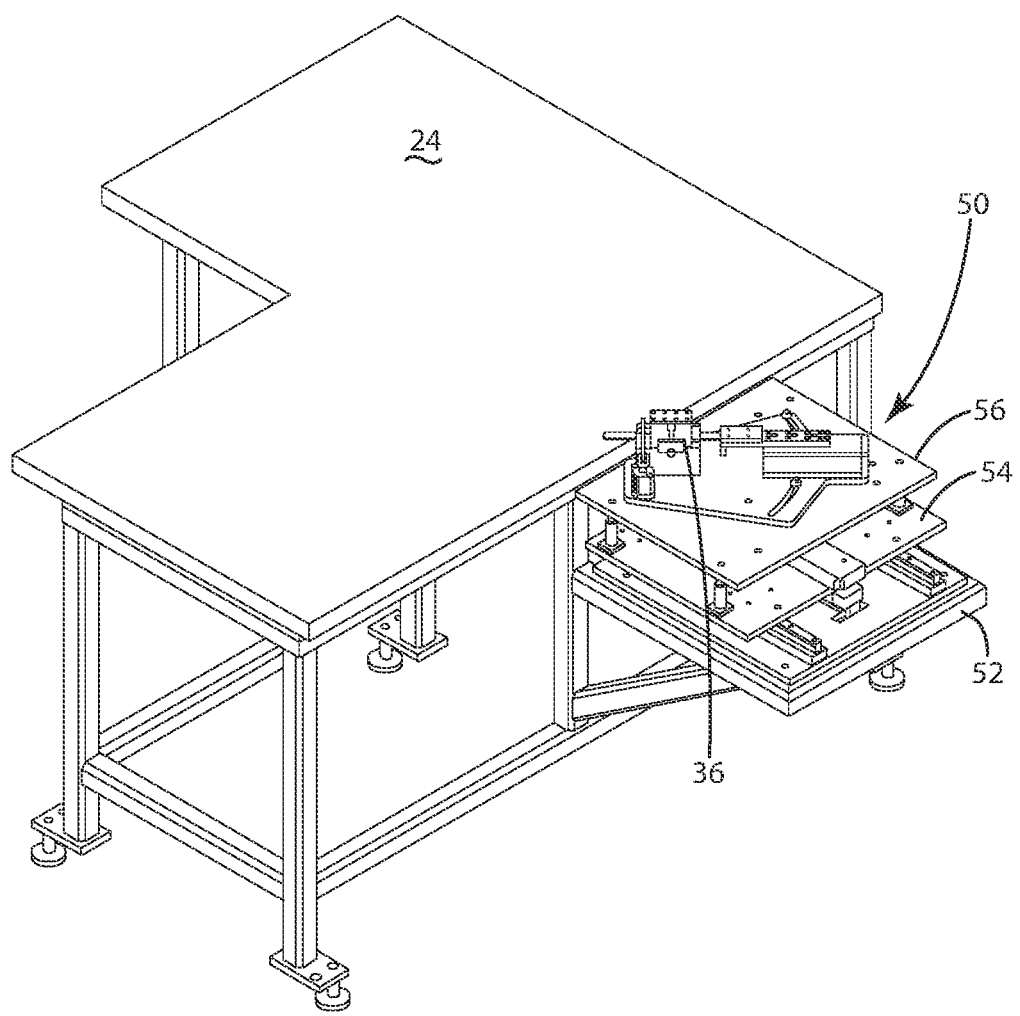
FIG. 7 illustrates a work surface having cutting assembly connected thereto.
Figure 8:
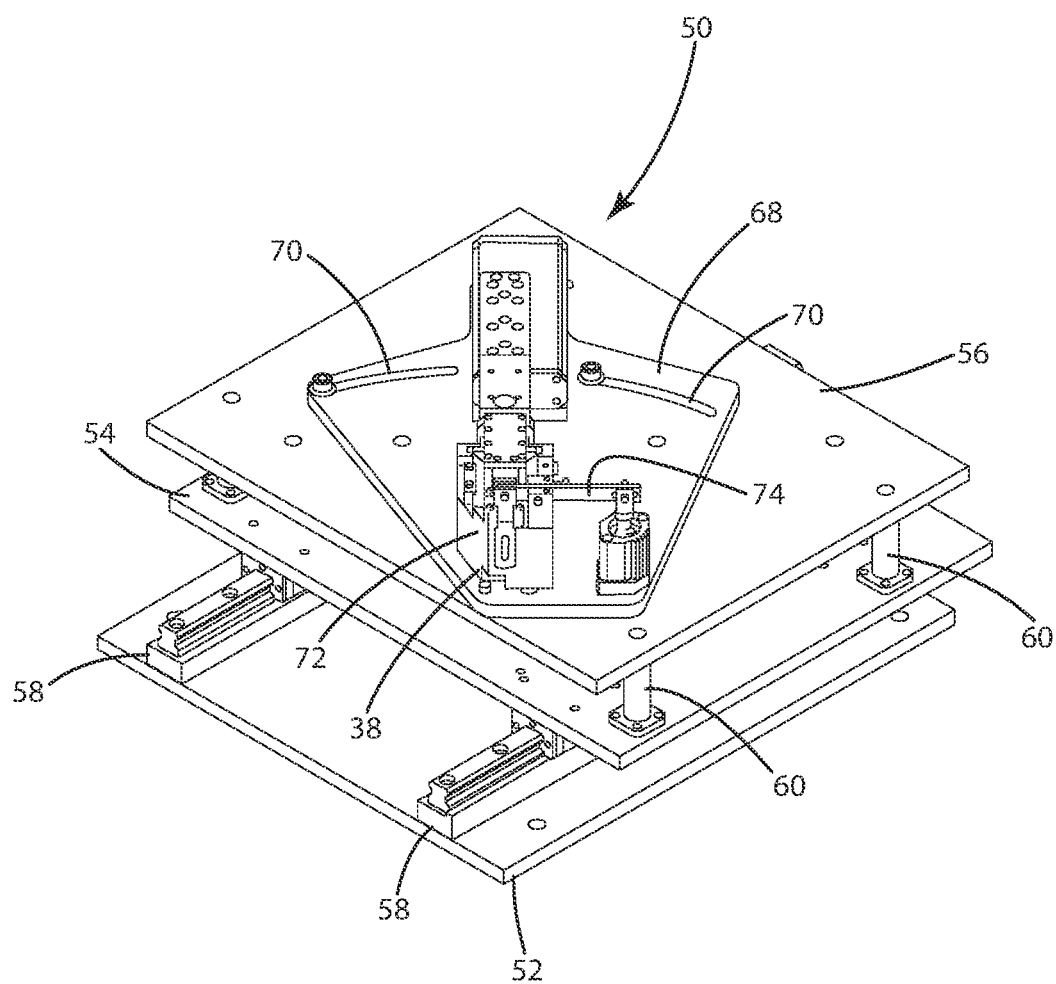
FIG. 8 illustrates a perspective view of an adjustable cutter assembly.
Figure 9:
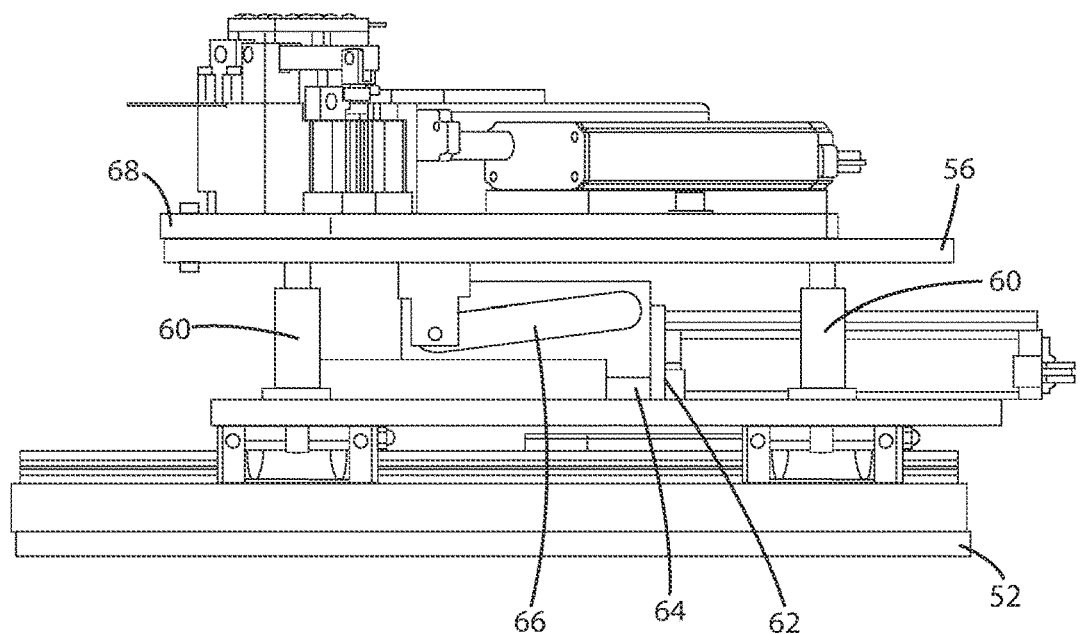
FIG. 9 illustrates a side view of an adjustable cutter assembly
Figure 10:
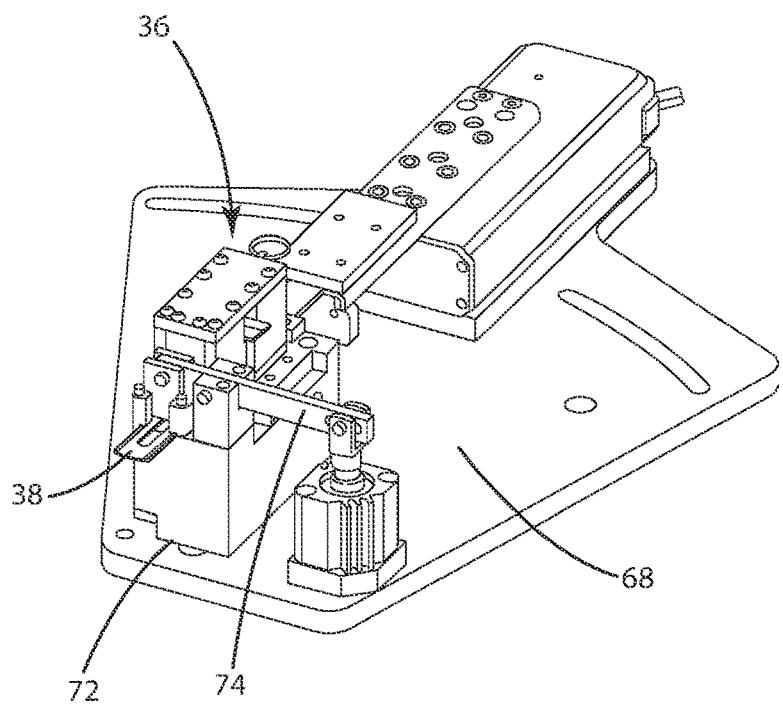
FIG. 10 illustrates a cutting tool mounted onto a pivot plate.
Figure 11:
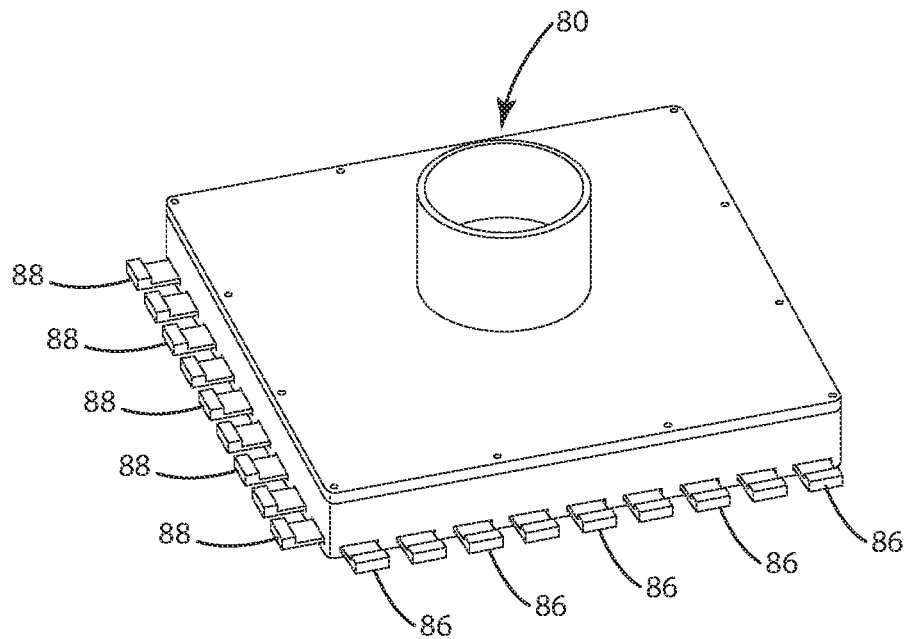
FIG. 11 illustrates a top perspective view of an end of arm tool.

In an embodiment illustrated in FIGS. 7-9, a cutter assembly 50 may be mounted on or positioned adjacent to the work surface 24. The cutter assembly 50 may include a series of adjustable shelves, including a base shelf 52 positioned at the bottom, a slide plate 54 positioned above the base shelf 52, and a mounting plate 56 positioned above the slide plate 54. The shelves 52, 54, 56 may be adjustable to position the cutter assembly 50 in the desired position for use or maintenance.

The base shelf 52 may include one or more slides 58. The slides 58 may be positioned generally perpendicular to an edge of the work surface 24 to allow the slide plate 54 to move towards and away from the work surface 24. The slides 58 may provide a range of movement to allow for both fine adjustment of the cut depth as well as movement of the slide plate 54 between a use position (where the cutter 36 is engaged toward the work surface 24) and a maintenance position (where the cutter 36 is slid away from the work surface 24). The cutter assembly 50 may include a motor to provide automated movement of the slide plate 54 along the slides 58. The slide plate 54 may be automatically adjusted to modify the cuter depth based on the dimensions and characteristics of the case 12 to be cut and decanted.

With reference to FIG. 9, the slide plate 54 may be configured to alter the height of the cutter 36. The slide plate 54 may include a plurality of guide shafts 60 positioned between the slide plate 54 and the mounting plate 56, such as at or near the corners of the slide plate 54. The guide shafts 60 may freely move to allow height adjustment of the mounting plate 56 with respect to the slide plate 54. The slide plate 54 may further include a pusher 62 and wedge block 64 configured to raise and lower the mounting plate 56. The pusher 62 may comprise a cylinder or shaft configured to push the wedge block 64. The wedge block 64 may include a slanted groove or surface 66 configured to support the mounting plate. As the wedge block 64 is pushed in a first direction, the mounting plate 56 may be raise, and when the wedge block 64 is pushed in a second direction opposite the first direction, the mounting plate 56 may be lowered. The height adjustment control of the mounting plate 56 may be automated, such as through sensors to provide height position feedback and automated control of the pusher 62 to automate control of the cutter height based on the case 12 that is to be cut.

The mounting plate 56 may be configured to hold the cutter 36 and to allow for rotational or articulation movement of the cutter 36. For example, the cutter 36 may be mounted on a pivot plate 68. The pivot plate 68 may be positioned on the mounting plate 56 and configured to move rotational with respect thereto. The pivot plate 68 may include one or more curved or arced openings 70 to receive a bolt or connected element therethrough. The pivot plate 68 may be pivoted along the arced openings 70 to adjust the angle of the blade 38.

The cutter 36 may be configured to utilize a replaceable blade 38. The replaceable blade 38 may be held within a blade clamp block 72. The blade clamp block 72 may selectively clamp a blade 38 to hold the blade in place and release the blade 38 to allow the blade 38 to eject or be removed from the cutter 36. A blade clamp arm 74 may further lock the blade 38 in place while it is held within the blade clamp block 72.

The cutter assembly 50 may be automated to control both adjustments to blade cutting positions as well as blade replacement. For example, when the unpacking system 10 determines the characteristics of a case 12 is present at the cutting assembly 50 it may adjust the cutting assembly parameters, including adjusting the depth of the slide plate 54 to modify the cutting depth. The system may further track the number of cuts made on each blade 38 to determine when the blade 38 should be replaced, such as when a predetermined cutting threshold has been reached.

To initiate replacement of the blade 38, the unpacking system 10 may first determine that the current blade 38 has reached its threshold of use. The slide plate 54 may be moved away from the work surface 24 and the clamp block 72 and blade clamp arm 74 may be released to allow the blade 38 to be ejected from or fall from the clamp block 72. The blade 38 may be caught by or deposited into a used blade bin. Once the old blade 38 is removed, a new blade 38 may be inserted into the clamp block 72. The new blade 38 may be automatically inserted, such as from a blade magazine that contains a plurality of blades 38. Once the new blade 38 is in position, the clamp block 72 and clamp arm 74 may be closed to lock the new blade 38 in place for use.

The unpacking system 10 may be configured to unload products in the cases 12 into secondary containers, such as bins or totes 14. Empty totes 14 may enter on the tote delivery conveyor 26 and filled totes 14 may exit on the tote exit conveyor 28. Once the empty totes 14 reach the end of the tote delivery conveyor 26 they may be moved laterally, such as by a pusher, transfer, or the like, to an unloading position near the edge of the work surface 24. The empty totes 14 may remain at the unloading position until they are filled with products from the cases, then may be conveyed away on the tote exit conveyor 28 once they are filled.

The unpacking system 10 may be specifically configured to unload product from cases 12 through a bottom flap created in the cutting process. For example, cases 12 may be cut by the cutter 36 along all but one side of the case 12, at or near the bottom of the case 12. In an embodiment, the cutter 36 may be configured to cut along a predetermined cut line contained within the bottom half of each cut side. In another embodiment, the cutter 36 may be configured to cut along a predetermined cut line contained within the bottom quarter of each cut side. In another embodiment, the cutter 36 may be configured to cut along a predetermined cut line that is two inches or less from the bottom of each cut side. While these dimensional restrictions are provided as examples, it will be appreciated that the cut may be made at any distance from the bottom of the case 12 that allows for a bottom portion of the case 12 to fall open when the case 12 is removed from a support surface.

The robot 20 may be configured to move the cut case 12 from the work surface 24 to the unload position, off the work surface 24. The robot 20 may hold the case 12 above the cut line while moving or sliding the case 12 along the work surface to the unload position. Once the case 12 clears the work surface 24 and the bottom of the case is no longer supported by the work surface 24, the bottom portion of the case will drop out, secured by only one side of the case 12, allowing products in the case to drop into the empty tote 14 at the unload position.

The automated method of unloading and unpacking cases 12 may include the following steps. It will be appreciated that the order of the steps may be varied or certain steps may be removed in given embodiments. A plurality of cases 12 are provided, such as on a pallet 22 or in an arranged stack. The cases 12 are unloaded one at a time, such as by a robot 20. The robot 20 may pick up a case 12 and set it onto the work surface 24. The robot 20 may then move the case 12 along the work surface 24 to engage the cutting blades 38. This process may also include a configuration allowing an operator to manually move the case 12 across the cutting blade 38. The cutting blade 38 may be set at an appropriate height and depth for cutting the unloaded case 12, as described in further detail below. The robot 20 may direct the case 12 to engage the cutter on all but one of its sides, such as three of its four sides, to leave one side of the case 12 attached and the remaining sides cut. Once the cut is complete, the robot 20 may move the case 12 off the work surface 24 to the unload position. An empty tote 14 may be positioned at the unload station beneath the work surface 24, with sufficient clearance to allow the bottom of the case 12 to fall down. When the case bottom drops, the case contents will fall into the tote 14. Once the case 12 is empty, the robot 20 will discard the empty case 12 onto the case refuse conveyor 30 to send the case 12 to be recycled. The loaded tote 14 may remain in load position if it is able to receive additional products or may be conveyed away from the work surface 24 if the tote 14 is full, and a new empty tote 14 may be slide into load position.

In an embodiment, the unpacking system 10 may be configured to adjust settings of the system components described above based on parameters of the case 12 and/or products held within the case 12. The settings of the system may be manually adjusted or automated to adjust on their own. Determination of the case and product parameters may be done through manual entry of information or may be read and input into the system automatically, such as through a barcode reading, scanning, network download, or the like of the cases 12 positioned at the pallet 22.

Each case 12 that is programed into the system may include a recipe. The recipe may define settings or parameters of the system to be used while unloading each different type of cases 12. The settings may include the height of the cutter 36 during the cut operation, the depth of the blade 38 during the cut operation, the number of sides to be cut on the case 12 during the cut operation, the number of products to be emptied into a tote 14 before it is conveyed away from the work surface 24, and any other settings that may be adjusted or varied to customize the unloading process for a given case 12. At the beginning of each unloading operation, or at the beginning of unloading each pallet 22, a recipe may be entered into the system 10 or maybe determined from scanning, reading, or otherwise sensing parameters of the cases 12. The system settings may then be adjusted to match the recipe parameters.

It will be appreciated that any steps of the method described herein may be carried out by robots 20, automated machines, or be performed manually. Additional robots 20 or automated machines may be added to the system to provide redundancy or to speed up operations and reduce cycle times.

In an embodiment, the unpacking system 10 may include a suction tool 80. The suction tool 80 may be configured to connect to the robot 20, such as too an arm of the robot 20, to provide a suction connection and enable the robot 20 to lift, move, or retrieve to a case 12 to be decanted. The suction tool 80 may be configured to receive a suction connection input and to output a variably sized and shaped suction connection along a flat surface. The variably sized suction connection may be configured to specifically sized and shaped to connect to a target case 12 without also connecting to any other adjacent or nearby case 12 that are not intended to be moved.

Figure 12:
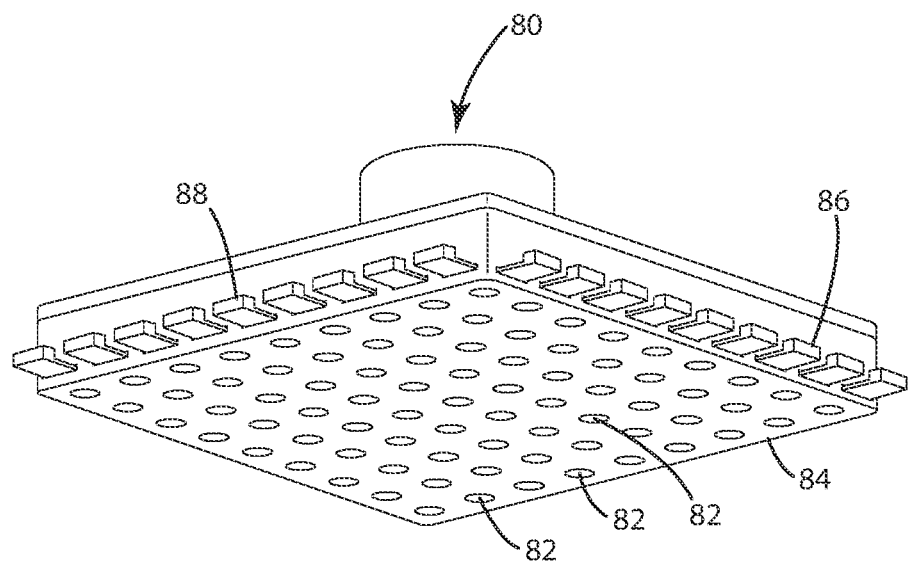
FIG. 12 illustrates a bottom perspective view of an end of arm tool.

As shown in FIG. 12, the suction tool 80 may include a plurality of openings 82 along a generally flat bottom surface 84. The openings 82 may comprise circular openings configured into a grid arrangement having rows and columns of openings 82. The suction tool 80 may be configured to enable suction through a group or cluster of openings 82, or multiple groups or clusters, of openings 82. The group or cluster of openings 82 having enabled suction may be referred to herein as a suction zone 92. The suction zone 92 may be adjustable to match the size and location of a case 12 to be moved.

Figure 13:
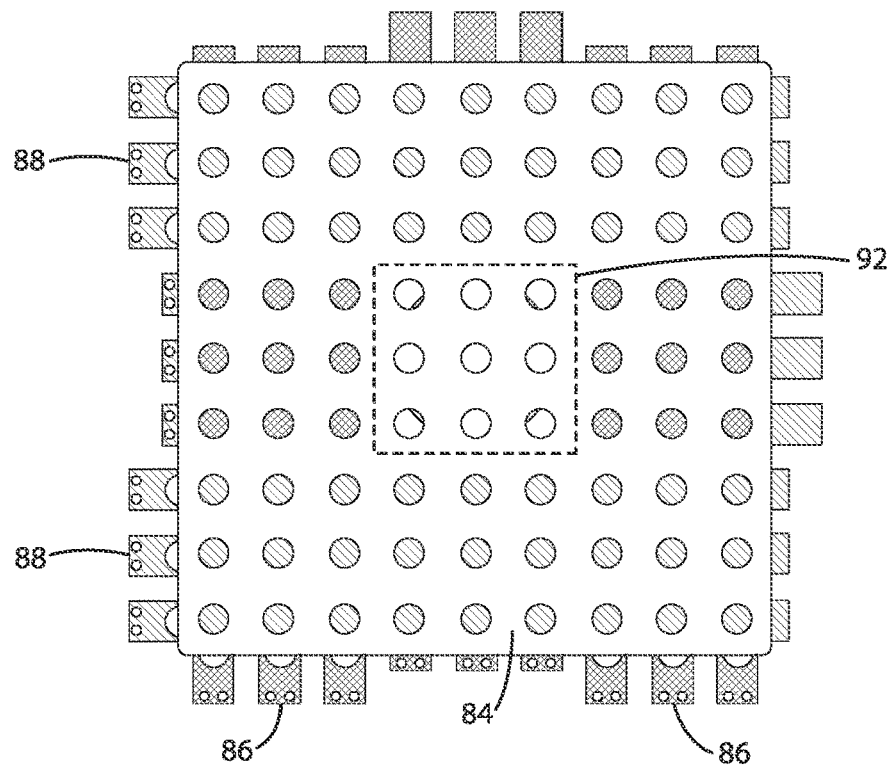
FIG. 13 illustrates a bottom view of an end of arm tool with central suction opening.
Figure 14:
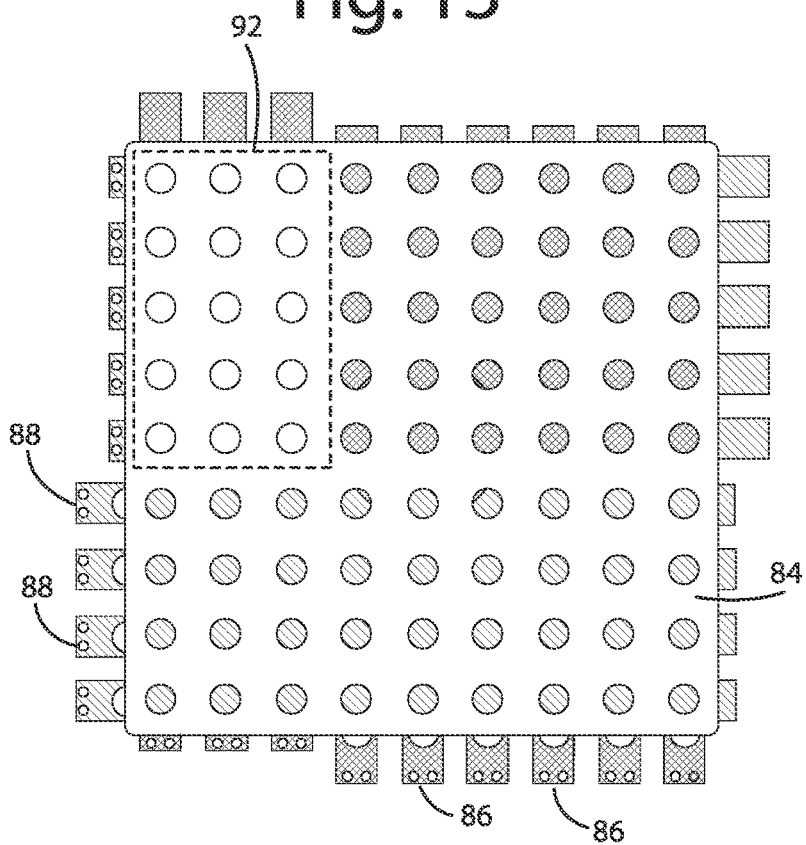
FIG. 14 illustrates a bottom view of an end of arm tool with a corner suction opening.
Figure 15:
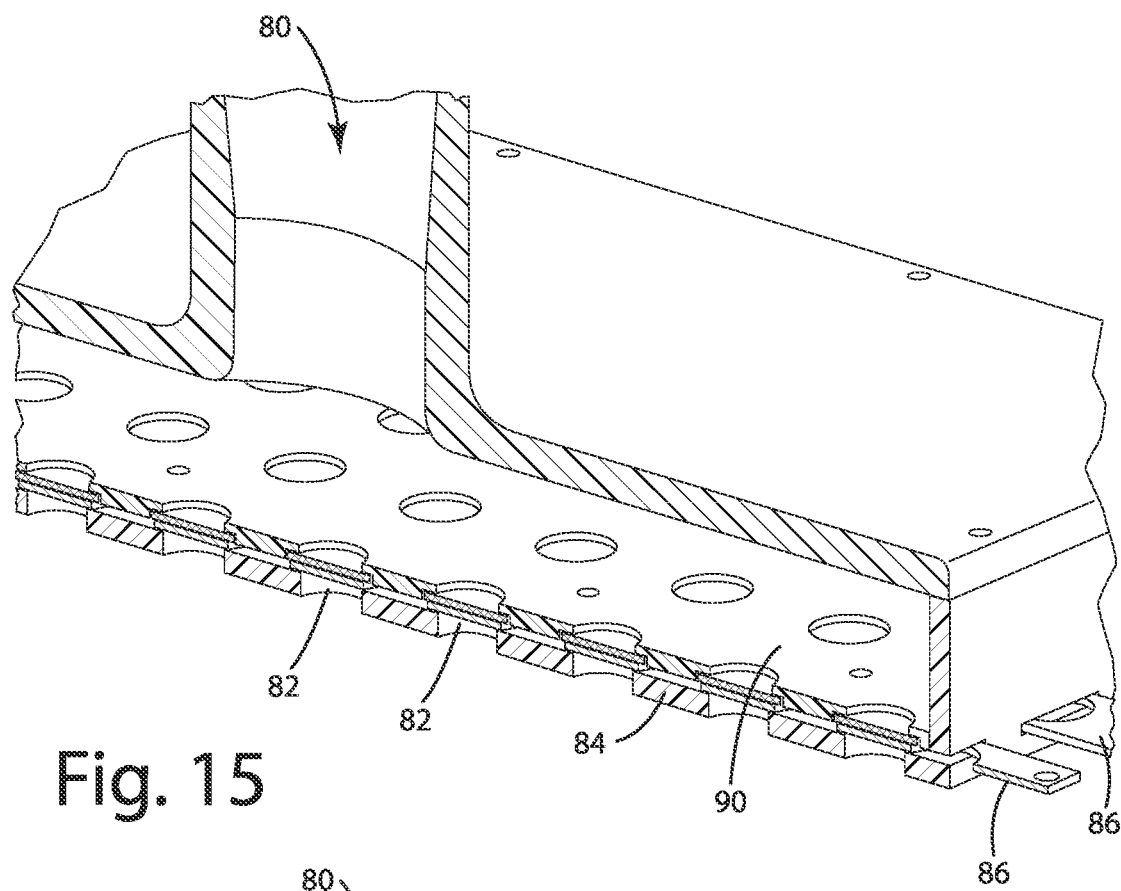
FIG. 15 illustrates a cutaway view of an end of arm tool having all suction openings closed.
Figure 16:
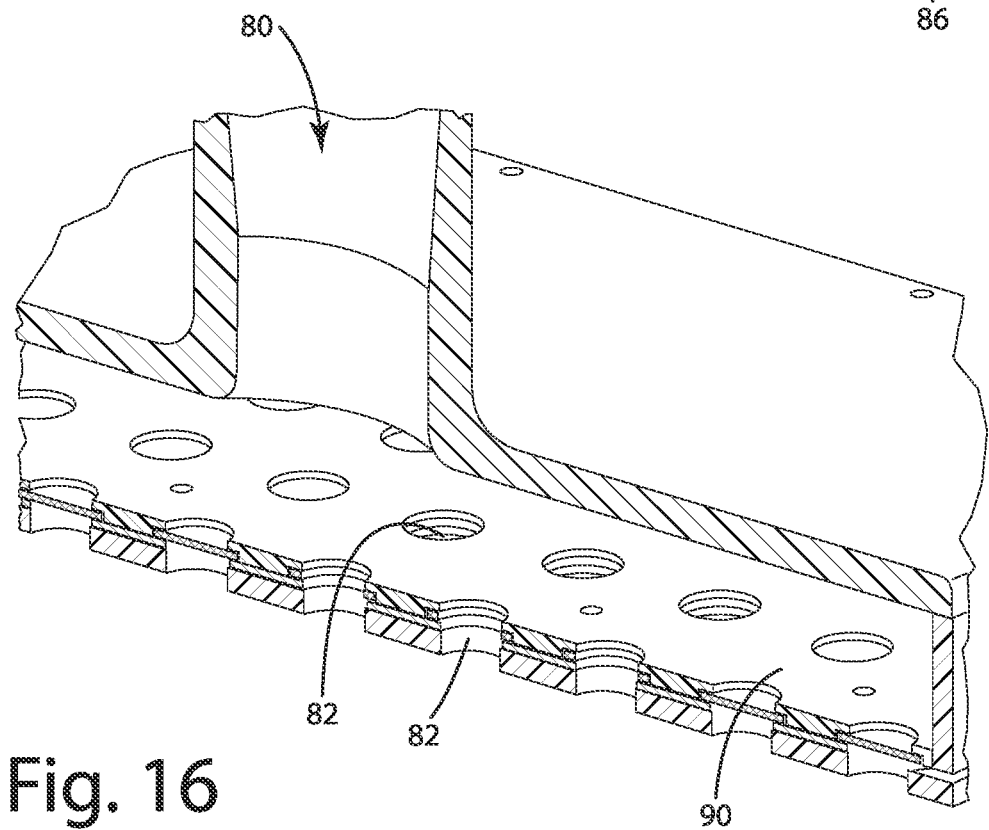
FIG. 16 illustrates a cutaway view of an end of arm tool having a plurality of suction openings opened.

The suction tool 80 may include a plurality of slides, specifically vertical slides 86 and horizontal slides 88. The slides 86, 88 may be inserted along a first and second adjacent sides of the suction tool, extending past each opening through the tool, as shown in FIGS. 13 and 14. Each slide 86, 88 may include a plurality of openings configured to align with the openings 82 in the corresponding row or column. The slides 86, 88 may be adjusted between open and closed positions by sliding the slides 86, 88 toward or away from the side that it is inserted through. In closed position the openings of the slide are not aligned with the openings 86 of the corresponding row or column to block any flow through said openings. In open position the openings of the slide are aligned with the openings 86 of the corresponding row or column to allow flow through said openings. In order to open flow through any given suction zone 92, both slides 86, 88 corresponding to each opening 86 in the zone must be in open position.

The suction tool 80 may include a top plate 90 to assist with holding the slides 86, 88 in alignment with each respective row and column. The top plate 90 may be positioned above the slides 86, 88 to contain the slides 86, 88 between the top plate 90 and the bottom surface 84 of the suction tool 80. The top plate 90 may further include slots or guides to hold the slides 86, 88 in vertical or horizontal alignment with their respective row or column.

The slides 86, 88 may be configured to move automatically in response to an input signal. For example, the slides 86, 88 may each be connected to a cylinder, solenoid, motor, or the like to automatically facilitate movement of the slides and change the location and size of the suction zone 92 or suction zones 92.

It will be appreciated that certain automated features of the unpacking system 10 may utilize traditional automation components, including a central controller or processor, such as a microcontroller or logic controller. The controller may be configured to receive inputs signals from a variety of inputs, such as position or proximity sensor inputs and the like. The controller may further be configured to control outputs of the system, such as motors, valves, solenoids, and the like. The controller may specifically be configured to monitor and control the flow, speed, and movement of the conveyors 26, 28, the movement of the robots 20 including unloading and movement of cases 12, and movement of the cutter 36 including height and depth positioning of the blade.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

The invention claimed is:

1. A product unpacking system comprising:
a plurality of cases, each case configured as a polygonal prism having a plurality of sides and a bottom disposed between the plurality of sides, wherein each of the plurality of sides has a side dimension that extends between a side top and a side bottom, each of the cases each containing one or more products therein that are disposed in a void defined between the bottom and the plurality of sides;
a work surface positioned at a first height, the work surface configured to receive the plurality of cases thereon;
a cutter positioned at or adjacent to the work surface and having an adjustable cutter height selected based on a location of a predetermined cut line on the respective case, wherein the cutter is configured to cut a surface of at least two of the plurality of sides of the respective case along the predetermined cut line when the case is positioned adjacent to or at the cutter, and wherein the predetermined cut line is disposed closer to the respective side bottom than to the respective side top;
a product container positioned at an unload position adjacent to the work surface, wherein the unload position is disposed at a second height lower than the first height; and
a case movement device configured to:
remove a respective case from the plurality of cases and position the respective case on the work surface, such that the bottom of the respective case contacts the work surface;
move the respective case to the cutter to cut a plurality of sides of the case; and
move the cut case to the unload position over the product container to allow products within the case to drop through the bottom of the case into the product container.

2. The product unpacking system of claim 1 wherein each case of the plurality of cases has at least a first side, a second side, a third side, and a fourth side; and wherein the cutter is configured to cut the first side, the second side, and the third side of the case at the predetermined cut line when the case is positioned adjacent to or at the cutter, such that when the case is moved from the work surface to the unload position the bottom that remains secured only to the fourth side falls open to allow the products contained in the void to pass through the bottom and drop into the product container positioned at the second height.

3. The product unpacking system of claim 2 wherein the predetermined cut line is disposed along the side dimension in a bottom quarter of the respective side.

4. The product unpacking system of claim 3 wherein the predetermined cut line is disposed along the side dimension less than two inches from the respective side bottom.

5. The product unpacking system of claim 4 wherein the predetermined cut line is disposed along the side dimension directly adjacent to the bottom of the respective case.

6. The product unpacking system of claim 3, wherein the case movement device comprises a robot, and wherein the robot comprises a suction or gripper device for holding a case.

7. The product unpacking system of claim 6, wherein the robot includes a suction device configured to provide variable location and size of suction based on parameters of a case to be moved.

8. The product unpacking system of claim 7 further comprising:
an empty product container conveyor, wherein the empty product container conveyor is configured to convey empty product containers toward the work surface;
a positioning mechanism configured to move an empty product container from the empty product conveyor to the unload position;
at least one product container exit conveyor, wherein the at least one product container exit conveyor is configured to move product containers full of products away from the work surface; and
an empty case conveyor, wherein the empty case conveyor is configured to convey empty cases away from the work surface.

9. The product unpacking system of claim 1 further configured to adjust a depth of the cutter based on known parameters of a respective case.

10. A method of case unpacking comprising:
receiving a case having a plurality of sides and a bottom disposed between the plurality of sides onto a work surface, such that the bottom of the case contacts the work surface, the case having one or more products disposed within a void positioned between the plurality of sides and the bottom of the case;
moving the case, with a robot, into a position wherein a first side of the case is disposed adjacent to a cutter;
adjusting a height and a depth of the cutter based on known parameters of the case, such that the cutter contacts the respective side at a predetermined cut line positioned within a bottom quarter of the respective side of the case;
cutting a first side of the case with the cutter at the predetermined cut line;
adjusting the position of the case, with the robot, such that a second side of the case is adjacent to the cutter and cutting the second side of the case with the cutter at the predetermined cut line;
moving the cut case to an unload position adjacent to the work surface; and
receiving the products disposed in the void into an empty product container at the unload position.

11. The method of claim 10, further comprising the step of receiving a recipe having a plurality of settings and a plurality of parameters related to a case to be unloaded, wherein the settings and the parameters include at least one of a cutter height, a cutter depth, and a total number of products to be deposited into an empty product container.

12. The method of claim 11 further comprising the step of adjusting the position of the case such that a third side of the case is adjacent to the cutter and cutting the third side of the case with the cutter at the predetermined cut line.

13. The method of claim 12, wherein the step of receiving the products disposed in the void into an empty product container at the unload position further includes allowing the bottom of the respective case to fall open to allow the products within the void to the case to fall through the bottom into the empty product container.

14. The method of claim 13 further comprising the step of removing one or more cases from a stack of a plurality of cases with the robot.

15. The method of claim 14 further comprising the step of conveying the empty product container on a conveyor towards the work surface.

16. The method of claim 15 further comprising the step of moving an empty product container from the conveyor to the unload position.

17. The method of claim 14, wherein the robot includes a suction device configured to provide variable location and size of suction based on parameters of a case to be moved.

18. The method of claim 10 wherein each case is configured as a polygonal prism.

19. The method of claim 18 wherein each side of the respective case has a side dimension that extends between a side top and a side bottom, and wherein the predetermined cut line is disposed along the side dimension less than two inches from the respective side bottom.

20. The method of claim 19 wherein the predetermined cut line is directly adjacent to the bottom of the respective side of the respective case.

* * * * *